United States Patent Office 2,750,872
Patented June 19, 1956

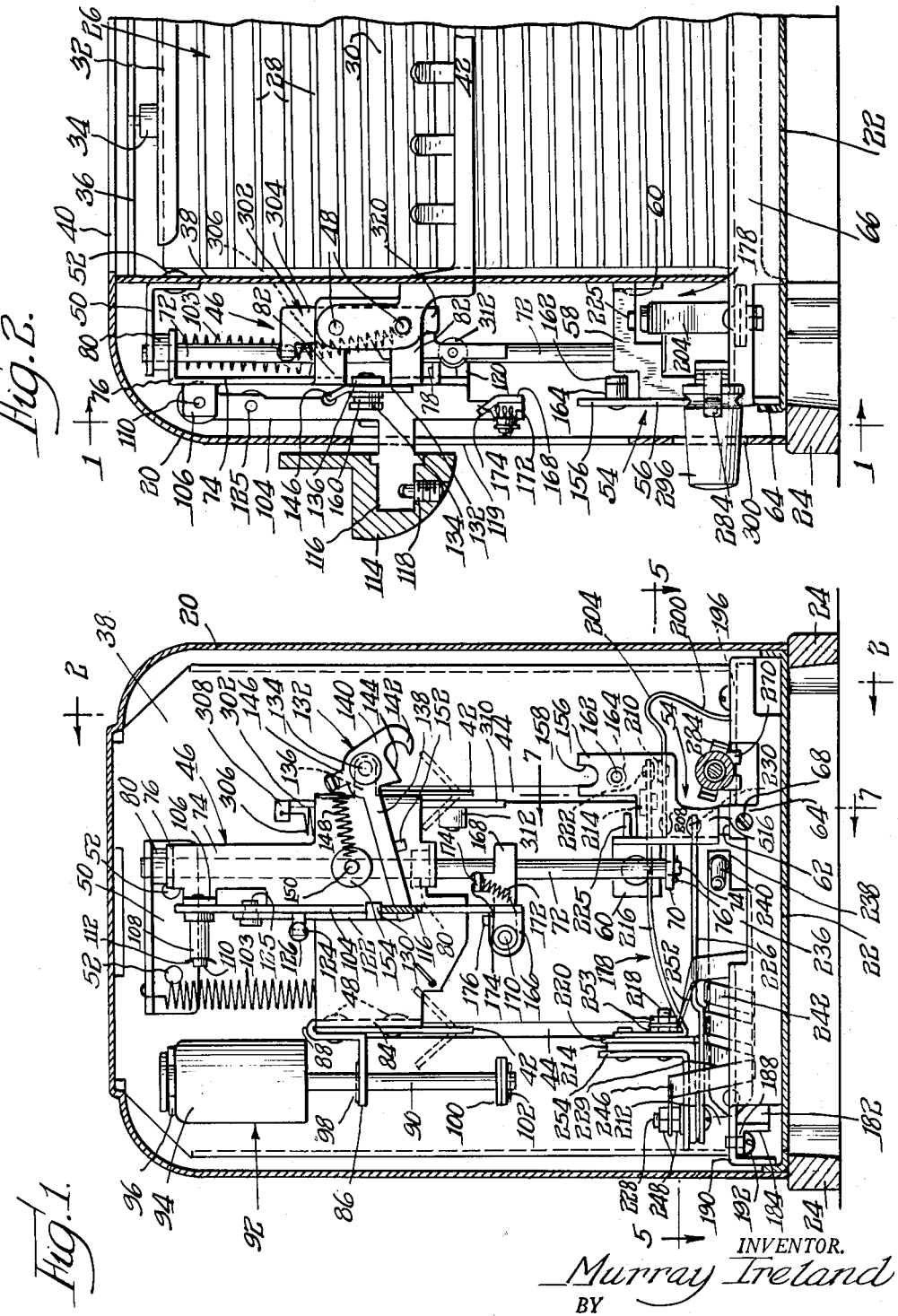

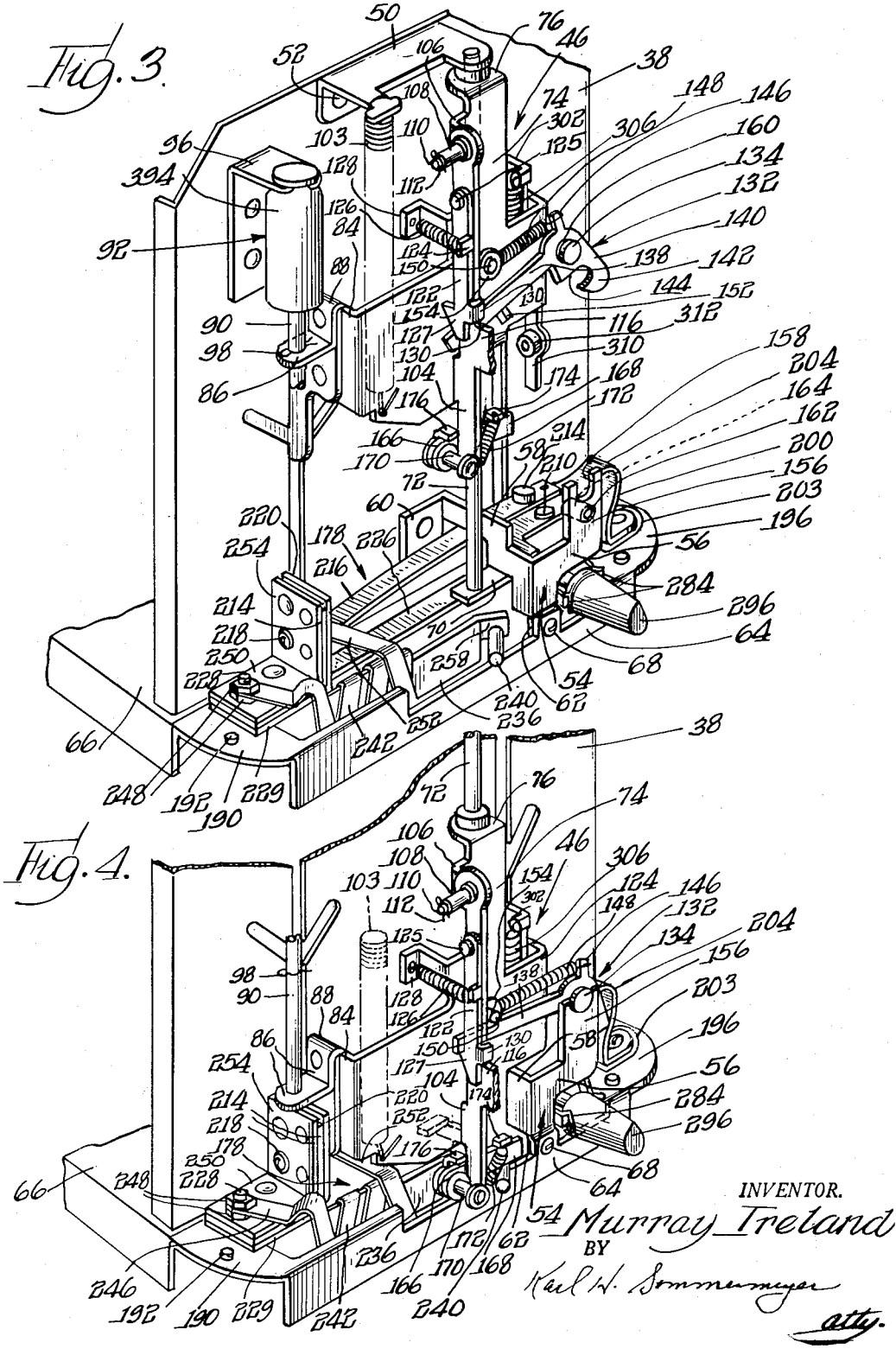

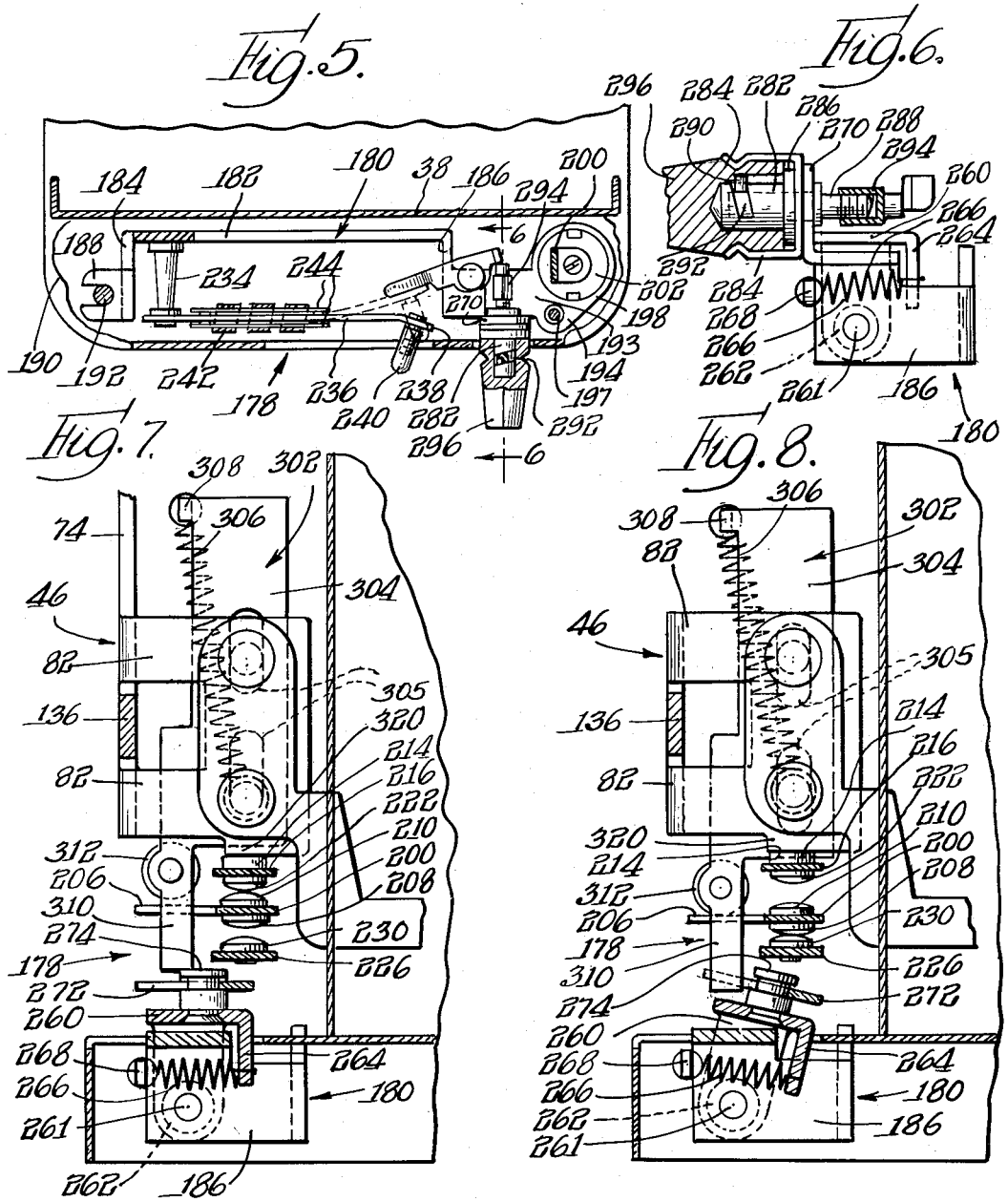
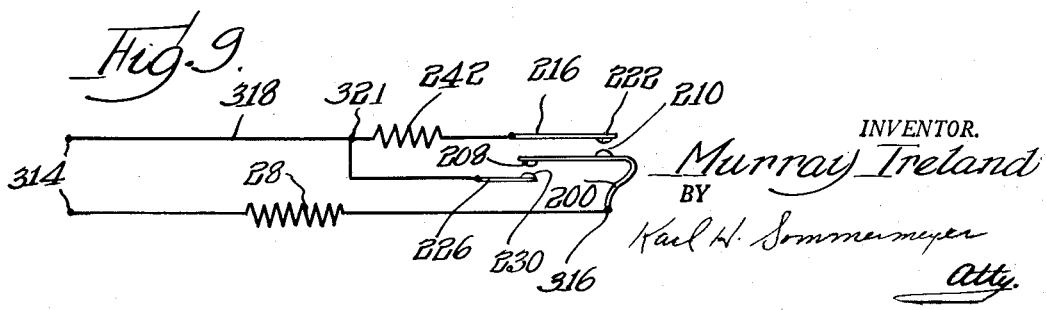

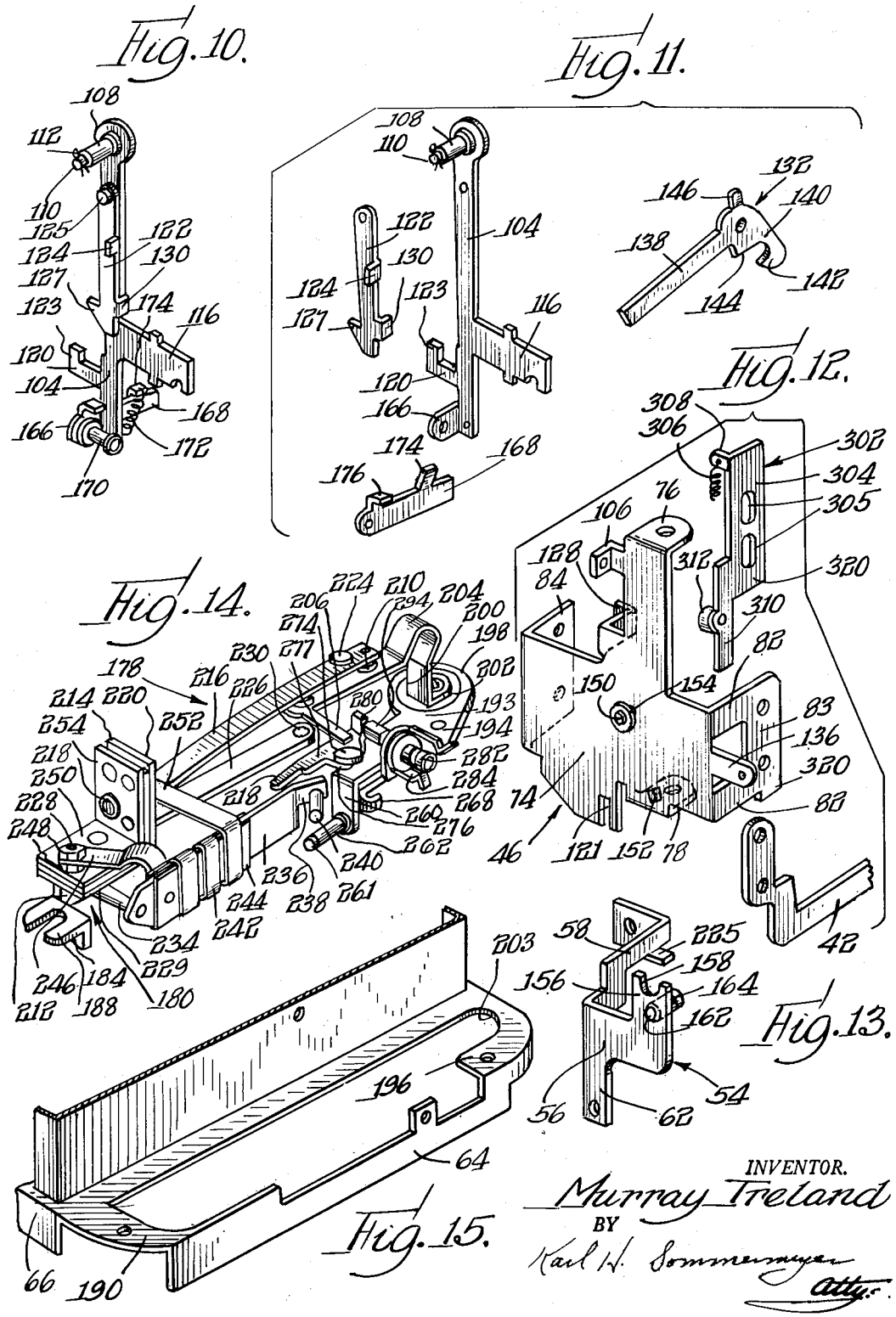

2,750,872

LATCH CONSTRUCTION FOR TOASTER

Murray Ireland, Elgin, Ill., assignor to McGraw Electric Company, Elgin, Ill., a corporation of Delaware Application April 10, 1953, Serial No. 347,935

10 Claims. (Cl. 99—329)

This invention is concerned generally with a toaster, and more specifically with a latch mechanism for an automatic toaster.

Automatic electric toasters generally are constructed with toast carrying trays for lowering bread slices to toasting position, and for then raising the toasted bread slices from toasting position to a partially expelled position where they can be grasped by the fingers for complete removal. The toast carrying trays generally are connected to a carriage which may be manually lowered by means of a handle projecting external of the toaster casing. The carriage is returned to its raised position by a spring at the end of an automatic toasting cycle. A latch mechanism holds the carriage in lowered position against the force of the spring while the toast is being toasted, and then is released under the control of an automatic timing mechanism.

For various reasons it may be desirable to remove the toast before the automatic toasting cycle is completed. Consequently, there is generally provided some sort of means for manually releasing the carriage from the latch mechanism to raise the toast carrying trays. In order to keep the operation of the toaster as simple as possible, it is desirable that no extra manually operable external parts be required for manually releasing the latch mechanism. Accordingly, it is desirable that the manual release be effected by means of the handle.

In certain previous automatic toasting latching mechanisms that have been manually releasable by means of the handle, certain defects have been present. Often, too much force on the handle has been required to release the latch mechanism. This has resulted in instability of the toaster with the danger and inconvenience of moving the toaster or upsetting it in attempting merely to operate it. Other mechanisms have been too complicated, thus adding to manufacturing difficulties and cost.

The broad object of this invention is to provide a new or improved latch mechanism for an automatic toaster obviating the above noted difficulties.

More specifically, it is an object of this invention to provide an automatic toaster latch mechanism of simplified construction and manually releasable with a minimum application of force on the handle.

Another object of this invention is to provide an automatic toaster latch mechanism including a hook-like lever mounted on the carriage and engageable with a fixed member on the toaster frame to hold the carriage down, said hook-like lever being manually releasable by a slight outward movement of said handle.

A further object of this invention is to provide an automatic toaster latch mechanism wherein the carriage is held down by a hook-like lever on the carriage, said lever being maintained in holding position by a detent or catch engaging the light end of the lever, and hence readily releasable.

Other and further objects and advantages of the present invention will be apparent from the following description when taken in conjunction with the accompanying drawings wherein:

Figure 1 is an end view of the toaster partly in section, constituting substantially a section along the line 1—1 of Fig. 2;

Fig. 2 is a vertical sectional view of the toaster taken substantially along the line 2—2 of Fig. 1;

Fig. 3 is a perspective view of the latch and thermal timing mechanism;

Fig. 4 is a fragmentary perspective view similar to Fig. 3 and showing the mechanism in a different position of operation;

Fig. 5 is a top view of the thermal timing mechanism taken substantially along the line 5—5 of Fig. 1;

Fig. 6 is a cross sectional view of a part of the thermal timing mechanism taken along the line 6—6 of Fig. 5;

Fig. 7 is an end view of the thermal timing mechanism taken substantially along the line 7—7 of Fig. 1;

Fig. 8 is a view similar to Fig. 7 showing the mechanism in a different position of operation;

Fig. 9 is a schematic wiring diagram;

Fig. 10 is a perspective view showing the handle carrying lever and the catch carried thereby;

Fig. 11 is an exploded perspective view showing parts of Fig. 10 with the addition of the hook-like lever for holding the carriage in lowered position;

Fig. 12 is an exploded perspective view of the carriage and certain parts carried thereby;

Fig. 13 is a perspective view of the part carried by the frame and cooperable with the hook-like lever;

Fig. 14 is a perspective view of the thermal timing mechanism; and

Fig. 15 is a perspective view of the end portion of the frame carrying the thermal timing mechanism.

Referring first to Figs. 1 and 2 for a general understanding of my invention, there may be seen toaster parts of known construction including a sheet metal casing 20 having a sheet metal bottom 22 provided with one or more plastic support pieces 24 for spacing the metal parts of the toaster above a supporting table or the like a sufficient distance to prevent scorching or overheating at the table. The toaster is provided with the usual electric resistance toasting elements 26 comprising ribbon-like resistance wiring 28 wound on mica sheets 30. The mica sheets 30 may be supported in any convenient manner such as by elongated metal holding or clamp members 32 carried by insulating members 34 on metal strips 36 extending between vertical, sheet metal end plates 38 (only one shown).

The casing 20 is provided at its top with a pair of elongated openings or slots 40 for inserting or removing slices of bread. The usual toast carrying trays 42 are received between opposed pairs of heating elements 26 beneath the openings 40. The toast carrying trays 42 extend at one end through slots 44 in the end plate 38 and are connected to a carriage 46 (see also Figs. 3 and 4) by any suitable means such as a plurality of rivets 48.

An angle bracket 50 is secured to the end plate 38 that is shown in Figs. 1–4 by rivets 52. A sheet metal bracket 54 is secured at the bottom of the plate 38. The bracket 54 has a front wall 56, a rearward extending strip 58 arranged at right angles thereto, and a rear tab 60 parallel to the front wall 56 and riveted or otherwise secured to the end plate. The front wall 56 is provided with a depending tab 62 fixed to a flange 64 of a sheet metal frame 66 by means such as a screw 68, the sheet metal frame 66 being supported on the bottom plate 22 and carrying the end plates 38.

A horizontally extending ear 70 on the rearward extending strip 58 of the bracket 54 is provided with an aperture. An aperture aligned therewith is provided in the horizontal flange of the angle bracket 50, and a carriage mounting rod 72 is fixed therein. The rod may be secured by any suitable means such as a reduced lower end portion 74 fitting through the aperture in the ear 70 and carrying a wire clip member 76 in an annular groove below the ear.

The carriage 46, shown in Figs. 1–4, 7 and 8 and best seen in Fig. 12, comprises a vertical front plate 74 having a horizontal flange 76 at its upper end, and a horizontal flange 78 adjacent the bottom edge. The flanges are provided with aligned apertures which receive bronze bushings 80 slideably mounted on the carriage mounting rod 72. The right edge (as viewed in Figs. 1, 3, 4 and 12) is provided with a pair of fingers 82 turned back at a right angle to plate 74 (Figs. 2, 7, 8 and 12) joined at their outer ends by an integral strip 83 (Fig. 12) and receiving the rivets 48 to secure the right toast carrying tray to the carriage.

The left edge of the carriage 46 (as viewed in Fig. 1) is provided with a right angle flange 84 to which the left toast carrying tray 42 is secured by a pair of rivets 48. The riveted connections of the toast carrying tray to the carriage insure up and down movement of the trays with the carriage. The upper rivet in the flange 84 also secures an angle bracket 86 on the flange 84, the upper end of the angle bracket 86 being turned over at 88 for greater stability. The angle bracket is provided with an aperture slideably receiving the piston rod 90 of a dash pot mechanism 92. The dash pot mechanism may be of suitable construction and includes a cylinder 94 (Figs. 1 and 3) secured on the end plate 38 by a bracket 96. A piston which preferably includes a valve (not shown) so that it moves down more readily than up is received in the cylinder 94 and is suitably secured to the rod 90. For moving the piston rod 90 the angle bracket 86 abuts a wire clip 98 received in an annular groove above the bracket 86, and washers 100 secured on the lower end of the piston rod 90. The spacing of wire clip from washers 100 provides a lost-motion connection between the piston rod 90 and the carriage.

A coil spring 103 is stretched between the horizontal flange of the bracket 50 and an aperture near the bottom of the plate 74 of the carriage 46, both ends of the spring being secured by any suitable means such as hooked-over end portions on the spring. The spring thus urges the carriage toward its upper position which is determined by abutment of the bronze bushing 80 at the top of the carriage against the horizontal flange of the angle bracket 50.

The improved latch mechanism is mounted on the carriage and includes an elongated lever 104 (Figs. 1-4, 10 and 11) journalled at its upper end on an ear 106 (Figs. 1-4 and 12) extending forward at right angles from the bracket plate 74. An elongated bronze bushing 108 is fixed to the lever 104 and fits over an elongated stud 110 fixed on the ear 106. A spring clip 112 fitting in an annular groove on the end of the stud 110 prevents the bushing from slipping off the end of the stud. This elongated bearing prevents lateral play of the lever 104.

A handle 114 (Fig. 2) of molded plastic or other thermal insulating material is suitably secured on a forward extending projection 116 (Figs. 1-4, 10 and 11) of the lever 104 by a set screw 118 (Fig. 2). The projecting member 116 extends out of the toaster casing through a vertical slot 119 for moving the toast carrying tray up and down. A prong 120 (Figs. 2, 10 and 11) extends in from near the bottom of the lever 104 through a slot 121 (Fig. 12) in the plate 74 and is provided at its free end with an ear 123 (Figs. 10 and 11) which is twisted or deflected after assembly to limit outward movement of the handle 114 and lever 104.

A catch 122 (Figs. 1, 3, 4, 10 and 11) in the form of an elongated finger is pivoted on a rivet 125 near the upper end of the lever 104 and is provided at its lower end with a tooth 127 facing the carriage plate 74 and having a horizontal upper edge and a beveled lower edge. A lug 124 extends from the left side of the catch 122, and a coil spring 126 is stretched between this lug and a flange 128 carried by the carriage plate 74 and offset therefrom toward the end plate 38. A lug 130 extends from the right side of the catch 122 and abuts the lever 104 to limit movement of the catch 122 under the influence of the spring 126.

A hook 132 (Figs. 1-4 and 11) is pivoted on a stud 134 fixed on an ear 136 (Figs. 1, 2, 7, 8 and 12) extending from the side of the plate 74 and struck out from between the fingers 82. The hook comprises a straight shank 138 extending past the lever 104 and catch 122 and between the lever and carriage plate 74. A finger 140 extends at an obtuse angle to the shank 138 from the pivot 134 and includes a tip or tooth 142 and a shoulder or striking face 144. The hook 132 is provided with an upward and outward extending lug 146, and a coil spring 148 is stretched between this lug and a stud 150 on the plate 74. This spring normally swings the hook 132 to the position shown in Figs. 1 and 3 where it stops against a projection 152 struck out of the surface of the carriage plate 74. A washer 154 (Figs. 1, 3 and 4) is secured on the stud 150 out from the plate 74 a sufficient distance to allow the shank 138 to pass behind the washer (Fig. 4) and against the stud which serves as a stop for it. In the position of Fig. 4 the washer 154 lies in front of the shank 138 of the hook 132 for holding it against forward movement when catch 122 is drawn forward for disengaging it. Thus the bearing 134 that supports hook 132 is not required to be tight enough to hold shank 138 against such forward movement.

The front wall 56 of the bracket 54 is provided with an upstanding portion 156 (Figs. 1-4 and 13) underlying the pivotal mount 134 of the hook 132. The top of the upstanding portion 156 is provided with a recess 158 which is slightly greater than a semicircle. This recess is in position to receive a reduced neck portion 160 of the stud 134 when the carriage 46 is moved to its lowered position.

A headed stud 162 projects from the upward extending portion 156 of the bracket 54 toward the end plate 38 and rotatably carries a roller 164. This roller is in position to engage the shoulder 144 of the hook 132 as the carriage is lowered to pivot the hook in a clockwise direction to cause the tooth 142 to swing under the roller for holding the carriage and toast carrying trays in lowered position, the shank 138 of the hook at the same time moving up against the beveled edge of the catch tooth 127 and camming the catch out until the shank 138 is above the square shoulder of the tooth 127. The catch then moves in under the force of the spring 126 to extend beneath the shank 138 to lock the hook in its clockwise rotated position with the hook 142 beneath the roller 164 (Fig. 4). The angle of the upper face of tip 142 of the hook 132 is such that the upward force of the carriage spring 103 tends to turn hook 132 counterclockwise as seen in Figs. 1, 3 and 4 for disengaging it from the roller 164. Thus, both the action and the spring 148 tend to disengage hook 132 for releasing the carriage. In the lowered position of the mechanism (Fig. 4), the groove 160 (Figs. 2 and 3) of stud 134 on the carriage lies in the recess 158 to hold the mechanism in alignment, particularly for preventing the forces acting between tip 142 of hook 132 and roller 164 from distorting the mechanism enough for letting those parts slip past each other.

The remainder of my improved latching mechanism comprises a laterally extending ear 166 (Figs. 1, 3, 4, 10 and 11) on the bottom of the lever 104. A trip lever 168 is rotatably mounted on the ear 166 by means of an elongated stud and bushing 170 to prevent side play. A coil spring 172 is stretched between the bottom end of the lever 104 and a deflected tab 174 on the upper edge of the trip lever 168. A lug 176 on the upper edge of the trip lever and overlying the ear 166 limits clockwise rotation of the trip lever 168 under the influence of the spring 172.

The novel latching mechanism described herein may be used with many different types of timing mechanisms. For purposes of illustration, a double acting thermal timing mechanism 178 (Figs. 1-5, 7, 8 and 14) is shown. The thermal timing mechanism 178 comprises a transverse, relatively rigid frame 180 of sheet metal, part of this frame having been omitted from Fig. 14 for clarity. The frame 180 is provided with a spacer bar 182 (Fig. 5) extending parallel to the end plate 38. The spacer bar 182 is arranged in a vertical plane and is provided at its opposite ends with right angularly disposed walls 184 and 186, these walls also lying in vertical planes. A spade lug 188 (Figs. 1, 5 and 14) extends horizontally from the top edge of the wall 184 and is secured against the under side of a horizontal portion 190 (Figs. 1, 3, 4, 5 and 15) of the frame 66 by means of a screw 192 for supporting the timer in the toaster frame.

The frame 180 further includes a horizontal plate 193 (Figs. 5 and 14) extending from the top edge of the wall 186. This plate is provided with an apertured mounting ear 194 adapted to be held against the under side of another horizontal portion 196 of the frame 66 by means such as a screw 197 (Fig. 5) passing through the ear and threaded into an aperture in the horizontal portion 196. The horizontal plate 193 further includes an enlarged portion 198 which supports a spring metal contact leaf 200 by means of any suitable insulated connection including two insulating discs of which one is shown at 202. The contact leaf spring 200 is provided with a U-shaped portion 204 for improved flexibility and is provided with a lateral extending switch operating arm 206 at its free end. A contact button 208 (Figs. 1, 7 and 8) is provided on the under side of the leaf 200 at its free end adjacent the switch operating arm 206. Another contact button 210 (see also Figs. 3 and 14) is carried on top of the leaf intermediate the contact button 208 and the U-shaped portion 204.

The frame 180 further comprises an upward extension 212 (Figs. 1 and 14) of the bar 182 at the left end thereof, and this upward extension is provided with an integral angle bracket 214 (Figs. 1, 3, 4 and 14).

A contact carrying leaf spring 216 is secured on the vertical flange of the angle bracket 214 by means such as a rivet and a screw 218 and is electrically insulated from the bracket by means of insulating plates 220 and 254. The lead 216 extends out over the leaf 200 and carries on its under side at its free end a contact button 222 (Figs. 1, 7 and 8) aligned with the contact button 210 on the leaf 200. The leaf 216 further carries on its top surface, and spaced in a short distance from the end, an actuating button 224 of suitable insulating material such as porcelain. A lug 225 (Figs. 1, 2 and 13) on the vertical strip 58 overlies the porcelain button 224 for limiting upward motion of lead 216.

An additional contact carrying leaf 226, this leaf being relatively rigid as compared with the flexibility of leaves 200 and 216, is secured to the under side of the angle bracket 214 by any suitable means such as rivets and a screw 228 (Figs. 1, 3, 4 and 14), and insulating sheets 229 and 250. The leaf 226 is provided at its outer end with an upward facing contact button 230 aligned with the contact button 208 on the leaf spring 200.

A stud 234 (Figs. 5 and 14) extends out or forward from the left end of the bar 182 and carries a bimetal strip 236 at its outer end. The bimetal strip is arranged substantially parallel to the bar 182 and is provided at its unsupported, right end with an outward deflected finger 238 which carries an elongated actuating pin 240. The actuating member preferably comprises a hollow cylinder threaded on to a stud for adjustment of the position of the member 240.

A ribbon-like resistance heating element 242 is wound around the bimetal strip 236 and is insulated therefrom by suitable means such as mica strips 244 (Figs. 5 and 14). One end 246 of the ribbon-like resistance heating element is clamped between a pair of nuts 248 on the screw 228 and thereby is electrically connected to the contact carrying leaf 226. The other end 252 of the resistance heating strip 242 is secured by means of a pair of nuts 253 (Fig. 1) on the screw 218 and is thereby electrically connected to the contact carrying leaf 216.

The frame 180 is provided with a pin or stud 261 in the wall 186 (Figs. 6, 7, 8 and 14). An angle bracket 260 is pivotally mounted on the stud by means of an elongated bronze bushing 262 extending from the side of the bracket 260 and fitting over the stud. The angle bracket is provided with a depending tail 264, and a coil spring 266 is stretched between this tail and a lug 268 extending lateral from the frame wall 186. This spring normally urges the bracket in a counterclockwise direction as viewed in Figs. 6–8, and rotation in this direction is limited by abutment of the horizontal flange of the bracket against an upstanding ear 270 on the forward edge of the horizontal plate 193.

An evener-like bar 272 is pivotally mounted on a stud on the top or horizontal flange of the pivotally mounted angle bracket 260. The stud has a wide, flat top 274. The stud is fixed in the angle bracket and passes through an aperture in an ear 276 on the side of the evener-like bar 272 for allowing free pivotal movement of said bar. The bar 272 is provided at one end with an extending finger 278 arranged in the path of the bimetal strip 236 to be contacted by said bimetal strip as the strip heats and deflects. The opposite end of the bar 272 is provided with an upstanding flange 280.

The upstanding ear 270 of the timer frame 180 is provided with a sleeve 282 (Figs. 5, 6 and 14) extending toward the front of the toaster. A spring clip 284 (see also Figs. 1–4) is trapped on the sleeve between the ear 270 and a flange 286 on the sleeve. A stud 288 is rotatably received in the sleeve, and a radial pin 290 on the stud extends outward through a spiral slot 292 in the sleeve. A generally hexagonal abutment member 294 is threaded onto the stud 288 and forms a sufficiently tight fit thereon to preclude accidental shifting after initial adjustment. A knob 296 (Figs. 2–6) of plastic or the like fits over the sleeve 282 and has a longitudinal internal slot that engages the pin 290 for rotating the stud 288. The knob is held over the sleeve by the ends of the clip 284 which fit into an annular groove in the knob. The knob preferably is knurled for ready rotation by the fingers and extends through an opening 300 in the toaster casing to permit manual adjustment of the degree of brownness to which toast is to be done.

A tappet 302 (Figs. 1–4, 7, 8 and 12) is mounted for limited vertical sliding movement on the carriage 46 and is in the form of a plate 304 having a pair of short, vertical slots 305 receiving the rivets 48 mounting the right-hand toast carrier 42 on the finger 82 of the carriage 46. The rivet-in-slot connection allows limited sliding movement of the tappet 302 relative to the carriage 46. The tappet normally is urged to its lowest position relative to the carriage by a coil spring 306 stretched between the lowest of the rivets 48 and an ear 308 on the tappet.

The tappet further includes a downward extending finger 310 aligned with the flat head 274 of the stud mounting the evener-like bar 272 on the angle bracket 260, the flat head thus forming a movable stop. The tappet carries an insulating member 312 of porcelain or the like mounted on the stud or rivet extending outwardly from the finger 310. The insulating member 312 is arranged to engage the switch actuating arm 206 of the contact carrying leaf 200 as will be apparent shortly hereinafter.

The electric circuit of the toaster is shown schematically in Fig. 9. The circuit extends from the lower one of the two terminals 314 in Fig. 9, through the toasting heaters 28, to switch blade 200. Thence it may extend either through upper switch blade 216 and bimetal heater 242 or through lower switch blade 226, and then to the other power terminal 314.

When the toaster is idle the parts are mechanically as shown in Figs. 1–3, and the electric circuits are open as shown in Fig. 9. Bread slices are placed on one or both of the toast carrying trays 42 and the handle 114 is pushed down to cause the tooth 127 of the catch 122 to engage beneath the shank 138 of the hook 132 as the hook tooth 142 engages beneath the roller 164, as all set forth heretofore.

As the carriage is thus lowered by depression of the handle 114, a downwardly projecting tab 320 (Figs. 2, 7, 8 and 12) on the lowermost finger 82 engages the porcelain button 310 on the leaf 216 as shown in Fig. 7. This bends the leaf down to bring the contact button 222 into engagement with the contact button 210. This action closes a series circuit (Fig. 9) through the ribbon-like bimetal heater 242, the contact leaves 216 and 200, and the toasting windings 28. This starts the bread toasting and starts the heating and deflecting of the bimetal strip.

When the carriage is lowered as just described, the depending finger 310 of the tappet 302 abuts the flat head stud or stop 274 carried by the pivotally mounted angle bracket 260. Downward movement of the tappet thus is stopped with the insulating member 312 just free of the operating arm 206 of the leaf 200. The tappet 302 thus is raised somewhat from its normal position relative to the remainder of the carriage and additional tension is applied to the spring 306.

Also when the carriage is lowered, the tripper 168 engages the top of the member 240 on the bimetal strip and pivots in a clockwise direction about its pivotal mount against the action of the spring 172.

After a predetermined deflection of the bimetal strip 236 as it is heated, the member 240 moves from beneath the tripper 168 which then drops down to horizontal position. Upon further movement of the bimetal strip the deflected tip 238 thereof engages the finger 278 of the evener-like bar 272 which then pivots about its mounting stud 274 until a flange 280 engages the abutment member 294 on the stud 288 as shown in Fig. 6 and in dashed lines in Fig. 5. The time at which this occurs, and hence the toasting time, can be varied within limits by rotation of the knob 296 and consequent axial shifting of the stud 288.

When the flange 280 engages the abutment member 294, the motion of the flange is substantially arrested. The bar 272, driven by bimetal 236, then pivots about the flange and abutment 294 as a fulcrum, and swings the angle bracket 260 about its pivotal mount 261, 262. This motion carries stop 274 from beneath the tappet 302 which then drops under the influence of the spring 306 to the position shown in Fig. 8 so that the insulating member 312 pushes the operating arm 206 down to shift the leaf 200 down to move the contact button 210 away from the contact button 222, and the contact button 208 into engagement with the contact button 230.

Referring again to Fig. 9, it will be seen that with the contacts 210 and 222 separated and the circuit closed at 208—230, the resistance heater 242 for the bimetal strip is removed from the circuit, while the toasting coils 28 remain energized. The bread thus continues to toast but the bimetal strip 236 cools off and straightens out toward its initial position.

As the bimetal strip returns toward its original position, the member 240 engages the tripper 168. This pivots the lever 104 out away from the carriage 46 and removes the tooth 127 of the catch 122 from beneath the shank 138 of the hook 132. This movement of the tooth 127 meets with comparatively little resistance because the tooth supports only the light end of the lever, i. e. the tooth is acting through a mechanical advantage. The hook 132 then turns counterclockwise to remove the tooth 142 from beneath the roller 164 so that the carriage is no longer held down. This allows the spring 104 to return the carriage to its original raised position, thus raising the toast carriers 42 and the toasted bread to a position in which the toast can be grasped with the fingers for removal from the toaster. Initial upward movement of the carriage is rather rapid until the horizontal flange of the angle bracket 86 engages the clip 98 on the piston rod 90 of the dash pot mechanism 92. This slows upward movement of the carriage and the toast carrying trays so that there is no shock to the mechanism as it reaches its uppermost position, and the toast is not thrown from the toaster. The dash pot piston rod 90 was lowered from the position shown in Figs. 1 and 3 to the position shown in Fig. 4, as will be readily understood, with the lowering of the carriage.

The carriage, in moving up, carries tappet 178 with it for releasing contact leaf 200 and bracket 260. This action restores the switches to their initial open-circuit condition.

It has been noted earlier that it is desirable to be able to release the latching mechanism manually as simply as possible to allow toast to be removed from the toaster without awaiting the completion of an automatic toasting cycle. Such release is effected quite simply by pulling out on the handle 114. This pivots the lever 104 out in the same manner as it is pivoted out by the actuating member 240 on the bimetal strip 236 to remove the toast 127 from beneath the shank 138 of the hook 132. This releases the hook 132 for movement away from the roller 164 so that the carriage is free to rise under the influence of the spring 104.

It will be seen that my improved latch mechanism is simple, rugged and effective, and is released automatically at the end of a toasting cycle, or may be released manually with a light touch on the handle of the toaster.

It will be understood that the particular form of my invention shown and described is for illustrative purposes, and it will be understood that the latch mechanism can be used with timing mechanisms other than the specific timing mechanism disclosed. The invention, therefore, is to be limited only by the spirit and scope of the appended claims.

I claim:

1. A toaster comprising a toasting compartment, means for toasting a slice of bread in said compartment, a toast carrying tray in said compartment mounted for movement between toasting and non-toasting position, a carriage connected to said toast carrying tray, means for moving said carriage to move said tray from non-toasting to toasting position, means for urging said carriage to move said tray from toasting to non-toasting position, a detent including a lever pivotally mounted on said carriage, a fixed frame in said toaster, means on said frame engageable by said detent to hold said carriage with said tray in toasting position, means tending to move said detent out of engagement with said means on said frame, a latch lever pivotally mounted on said carriage, a member pivotally mounted on said latch lever and having a catch thereon, means limiting movement of said member relative to said latch lever in one direction, means urging said member to the limiting position with said catch engageable with said detent lever to hold said detent in engagement with the means on said frame, and means for pivoting the latch lever to move said catch from said detent lever to free said detent for movement away from the means on said frame, said carriage urging means thereby being effective to move said carriage to effect movement of said tray to non-toasting position.

2. A toaster as set forth in claim 1 wherein the detent lever is substantially longer than the detent, and the catch engages the lever adjacent the end thereof whereby to gain a mechanical advantage for effecting a smooth release.

3. A toaster comprising a toasting compartment, means for toasting a slice of bread in said compartment, a toast carrying tray in said compartment mounted for up and down movement between toasting and non-toasting positions, a carriage connected to said toast carrying tray, a handle for lowering said carriage to move said tray down to toasting position, spring means tending to raise said carriage to raise said trays to non-toasting position, a carriage locking lever pivotally mounted on said carriage, a fixed frame in said toaster, means on said frame engageable by said locking lever to hold said carriage down against the force of said spring means, means tending to swing said locking lever out of engagement with said means on said frame, a latch lever pivotally mounted on said carriage, a member pivotally mounted on said latch lever and having a catch thereon, means limiting movement of said member relative to said latch lever in one direction, means urging said member to the limiting position with said catch engageable with said locking lever to hold said locking lever in engagement with the means on said frame, timing means for moving said catch away from said locking lever to release said carriage for raising by said spring means, and manually operable means for similarly moving said catch away from said lever.

4. A toaster as set forth in claim 3 wherein the manually operable means comprises a handle on said latch lever for lowering said carriage.

5. A toaster comprising a toasting compartment, means for toasting a slice of bread in said compartment, a toast carrying tray in said compartment mounted for up and down movement between toasting and non-toasting positions, a carriage connected to said toast carrying tray, a lever pivotally mounted on said carriage, a handle on said lever for lowering said carriage to shift said tray to toasting position, spring means tending to raise said carriage to shift said tray to non-toasting position, a holding lever pivotally mounted on said carriage, a fixed frame in said toaster, means on said frame engageable by said holding lever to hold said carriage down against the force of said spring means, means tending to swing said holding lever out of engagement with said means on said frame, a catch on the handle carrying lever engageable with said holding lever to hold it in engagement with the means on said frame, and timing means for pivoting the handle carrying lever to move said catch away from said holding lever to release the same for movement away from the means on the frame, said spring means thereby being effective to raise said carriage and move said tray to non-toasting position, said handle carrying lever being similarly manually pivotable by means of said handle to effect manual release of said holding lever.

6. A latch mechanism for a toaster comprising a toasting compartment, means for toasting a slice of bread in said compartment, a toast carrying tray in said compartment mounted for up and down movement between toasting and non-toasting positions, a carriage connected to said toast carrying tray, means for moving said carriage down to move said tray from non-toasting to toasting position, means for raising said carriage to move said tray from toasting to non-toasting position, a fixed frame in said toaster, a member on said frame, a lever on said carriage engageable with said member for holding said carriage in lowered position, means tending to disengage said lever from said means on said frame, a lever pivotally mounted on said carriage, having a catch thereon for maintaining the holding lever in holding engagement with the member on said frame, a timer positioned adjacent said last mentioned lever and having a control member, a second latch member on said last mentioned lever movable into position alongside said control member as said carriage is lowered, said second latch member moving into the path of said control member when said control member moves, said control member engaging said second latch member upon further movement of said control member to pivot the pivotally mounted lever for withdrawing said catch from said holding lever to release said holding lever to render the carriage raising means effective to raise said carriage.

7. A latch mechanism for a toaster as set forth in claim 6 wherein the holding lever is substantially hooklike and is provided with an abutment portion engageable with the member on the frame to pivot the holding lever into holding position.

8. A latch mechanism as set forth in claim 6 wherein the catch comprises a toothed member pivotally mounted on the pivotally mounted lever, and further including a handle on said pivotally mounted lever for lowering said carriage and for manually pivoting said pivotally mounted lever to free said holding lever.

9. A toaster comprising a toasting compartment, means for toasting a slice of bread in said compartment, a toast carrying tray in said compartment mounted for movement between toasting and non-toasting position, a carriage connected to said toast carrying tray, means for moving said carriage to move said tray from non-toasting to toasting position, spring means urging said carriage from toasting to non-toasting position, a lever pivotally mounted on said carriage and having a detent and a relatively long arm, a fixed frame in said toaster, means on said frame engageable by said detent to hold said carriage with said tray in toasting position, means tending to move said detent out of engagement with said means on said frame, a handle lever pivotally mounted on said carriage and movable outwardly away from said carriage, a handle on said handle lever and disposed at least in part on the outside of said toaster for manual manipulation, a catch pivotally mounted on the handle carrying lever and having a tooth thereon, spring means urging said catch inwardly of said toaster to position said tooth for engaging the long arm of the first mentioned lever to hold the detent in engagement with the means on said frame, means coacting between said catch and said handle carrying lever limiting movement of said catch in the direction urged by said spring means, said catch thereby being pivotally movable with said handle carrying lever upon manual manipulation of said handle to release the long arm of said first mentioned lever to free said detent for movement away from the means on said frame, the spring means acting on the carriage thereupon being effective to move said carriage to effect movement of said tray from toasting to non-toasting position, and timer engaging means operable by a toasting timer similarly to move said handle carrying lever pivotably for effecting release of the first mentioned lever.

10. A toaster as set forth in claim 9 wherein the timer engaging means comprises a member carried by the handle carrying member and pivotal about an axis substantially at right angles to that about which the handle carrying member pivots, spring means urging said member in a predetermined direction of rotation for urging said member laterally against a timer operated part with said part in one position of operation, means coacting between said member and said handle carrying member for limiting pivotal movement in said direction, the spring means acting on said member for moving said member from a position determined by engagement with said timer part upon retraction of said timer part into its limited position for engagement by said timer part upon return thereof to pivot said handle carrying member to effect release of the first mentioned lever.

References Cited in the file of this patent

UNITED STATES PATENTS

| Number | Name | Date |
|---|---|---|
| 550,908 | Chevalie | Dec. 3, 1895 |
| 2,099,210 | Ireland | Nov. 16, 1937 |
| 2,234,759 | Graham | Mar. 11, 1941 |
| 2,237,100 | Gomersall | Apr. 1, 1941 |
| 2,262,285 | Ireland | Nov. 11, 1941 |
| 2,336,640 | Sardeson | Dec. 14, 1943 |
| 2,336,696 | McCullough | Dec. 14, 1943 |
| 2,344,842 | Weeks | Mar. 21, 1944 |
| 2,541,207 | Cole | Feb. 13, 1951 |
| 2,592,826 | Scharf | Apr. 15, 1952 |